(12) United States Patent
Iga

(10) Patent No.: US 12,214,526 B2
(45) Date of Patent: Feb. 4, 2025

(54) METHOD OF MANUFACTURING SUBSTRATE

(71) Applicant: DISCO CORPORATION, Tokyo (JP)

(72) Inventor: Hayato Iga, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 278 days.

(21) Appl. No.: 18/046,198

(22) Filed: Oct. 13, 2022

(65) Prior Publication Data

US 2023/0137722 A1    May 4, 2023

(30) Foreign Application Priority Data

Oct. 29, 2021 (JP) ................................. 2021-177072

(51) Int. Cl.
*B28D 5/00*      (2006.01)
*B23K 26/38*    (2014.01)

(52) U.S. Cl.
CPC ............ *B28D 5/0011* (2013.01); *B23K 26/38* (2013.01); *B28D 5/0052* (2013.01)

(58) Field of Classification Search
CPC ..... B28D 5/0011; B28D 5/0052; B23K 26/38
See application file for complete search history.

(56) References Cited

U.S. PATENT DOCUMENTS

| | | | | |
|---|---|---|---|---|
| 2008/0035611 A1* | 2/2008 | Kuno | ................. | C03B 33/0222 219/69.1 |
| 2009/0212396 A1* | 8/2009 | Sugiura | ................. | B23K 26/53 257/618 |
| 2019/0304769 A1* | 10/2019 | Hirata | .................... | B23K 26/53 |
| 2019/0304800 A1* | 10/2019 | Yamamoto | ............. | B28D 5/047 |
| 2020/0122911 A1* | 4/2020 | Varriano-Marston | ........................ | B65D 77/2032 |
| 2021/0221026 A1* | 7/2021 | Nomaru | ................. | B23K 26/53 |
| 2021/0316476 A1* | 10/2021 | Nomaru | ............. | B23K 26/0622 |
| 2021/0323095 A1* | 10/2021 | Hu | ........................ | B23K 26/064 |
| 2022/0379520 A1* | 12/2022 | Yamamoto | ........... | B23K 20/002 |
| 2022/0410431 A1* | 12/2022 | Honoki | ................. | B23K 26/53 |
| 2023/0073379 A1* | 3/2023 | Nomura | ............... | B28D 5/0052 |
| 2023/0119333 A1* | 4/2023 | Iga | ....................... | B28D 5/0011 438/795 |

(Continued)

FOREIGN PATENT DOCUMENTS

| | | |
|---|---|---|
| JP | 09262826 A | 10/1997 |
| JP | 2016111143 A | 6/2016 |

*Primary Examiner* — Omar Flores Sanchez
(74) *Attorney, Agent, or Firm* — Greer, Burns & Crain, Ltd.

(57) ABSTRACT

A peel-off layer is finally formed in an area, i.e., a first inner area or a second inner area, in a workpiece that is closer to the center of the workpiece among a plurality of areas. The workpiece has a cylindrical shape, so that the second inner area is wider than the other areas, e.g., the second outer area, in which the peel-off layers are formed. Consequently, when the peel-off layer is finally formed in the second inner area, the internal stresses in the workpiece are dispersed in a wider range than when the peel-off layer is finally formed in the second outer area. Thus, large cracks thicknesswise of the workpiece are prevented from being developed from modified regions contained in the peel-off layer. Therefore, the amount of workpiece material to be disposed of in subsequent steps is reduced, resulting in increased manufacturing productivity.

6 Claims, 10 Drawing Sheets

(56) References Cited

U.S. PATENT DOCUMENTS

2023/0137722 A1* 5/2023 Iga .................... B23K 26/0876
                                                                        225/2
2023/0373129 A1* 11/2023 Honoki ................. B23K 26/70
2024/0227100 A1* 7/2024 Omiya ................. B28D 5/0082

* cited by examiner

METHOD OF MANUFACTURING SUBSTRATE

BACKGROUND OF THE INVENTION

Field of the Invention

The present invention relates to a method of manufacturing a substrate from a cylindrical workpiece having a first circular surface and a second circular surface that is positioned opposite the first circular surface.

Description of the Related Art

Semiconductor device chips are generally manufactured from a disk-shaped substrate made of a semiconductor material such as silicon (Si) or silicon carbide (SiC). The substrate is sliced from a cylindrical ingot made of a semiconductor material using a wire saw, for example (see, for example, Japanese Patent Laid-open No. 1997-262826). Saw kerfs that must be taken into account when slicing substrates from ingots with a wire saw are comparatively large as they are approximately 300 μm wide each. In addition, the sliced substrates leave minute surface irregularities on their surfaces, and are likely to be curved or warped as a whole. Therefore, the surfaces of the sliced substrates need to be lapped, etched, and/or polished to a flat smooth finish.

After an ingot has been sliced into substrates and the substrates have been finished, the amount of ingot material that is eventually left in the substrates is approximately ⅔ of the overall amount of ingot material. In other words, approximately ⅓ of the overall amount of ingot material turns into sawdust to be disposed of in the slicing and planarizing steps. For this reason, the productivity at the case of manufacturing substrates from ingots using a wire saw is low.

In view of the above problem, it has been proposed in the art to manufacture substrates from an ingot using a laser beam that has a wavelength transmittable through the material of the ingot (see, for example, Japanese Patent Laid-open No. 2016-111143). According to the proposed method, the laser beam is applied to the ingot while the focused spot of the laser beam is being positioned within the ingot, and the ingot and the focused spot are repeatedly moved relatively to each other along a processing-feed direction.

The laser beam thus applied to the ingot forms a peel-off layer including modified regions formed around the focused spots and cracks developed from the modified regions, in each of a plurality of areas in the ingot that extend along the processing-feed direction of the ingot. Then, external forces are exerted on the ingot, separating a substrate from the ingot along the peel-off layers that act as separation initiating points.

The proposed method is effective to reduce the amount of ingot material to be disposed of in the manufacture of the substrate from the ingot, resulting in increased productivity for the manufacture of the substrate, compared with a method of manufacturing a substrate from an ingot using a wire saw.

SUMMARY OF THE INVENTION

According to the proposed method of manufacturing substrates from an ingot, peel-off layers are formed in the ingot in a successive array of areas from one end side to the other side of the ingot in an indexing-feed direction perpendicular to the processing-feed direction. Specifically, once a peel-off layer has been formed in any one of the areas in the ingot, another peel-off layer is formed next in another one of the areas that is positioned adjacent to and spaced in the indexing-feed direction from the preceding area in which the peel-off layer has been formed immediately before.

The modified regions contained in the peel-off layers are regions where the crystal structure of the ingot material is disrupted. Therefore, the modified regions formed in the ingot tend to produce internal stresses in the ingot. The internal stresses increase as the volume of the modified regions in the ingot increases.

In addition, the internal stresses in the ingot accelerate the development of the cracks from the modified regions. Consequently, when a peel-off layer is formed in the area at the other end side of the ingot in the indexing-feed direction, i.e., one of the areas where a peel-off layer is to be finally formed, it is highly likely for cracks that are large in thicknesswise of the ingot to be developed from the modified regions.

As a consequence, a substrate manufactured from the ingot tends to have a rougher surface separated from the area at the other end side of the ingot in the indexing-feed direction than the rest portion of the substrate. In a subsequent step of planarizing the manufactured substrate, it is necessary to planarize the substrate in its entirety until the rougher surface of the substrate that has been separated from the area at the other end side of the ingot is planarized. According to the proposed method of manufacturing substrates from an ingot, therefore, the amount of ingot material to be disposed of in the planarizing step is increased, resulting in a reduction in the productivity for the manufacture of the substrate.

In view of the above difficulties, it is therefore an object of the present invention to provide a method of manufacturing a substrate from a workpiece with high productivity.

In accordance with an aspect of the present invention, there is provided a method of manufacturing a substrate from a cylindrical workpiece having a first circular surface and a second circular surface positioned opposite the first circular surface, the method including: a peel-off layer forming step of repeatedly moving the workpiece and a focused spot, the focused spot being positioned within the workpiece, of a laser beam that is applied to the workpiece and has a wavelength transmittable through a material of the workpiece, relatively to each other in a processing-feed direction parallel to the first circular surface, thereby forming a peel-off layer in each of a plurality of areas in the workpiece, the areas extending along the processing-feed direction, the peel-off layer containing modified regions formed around a plurality of the focused spots and cracks developed from the modified regions; and a separating step of separating the substrate from the workpiece along a plurality of the peel-off layers that act as separation initiating points. Further, the plurality of areas include: a first outer area included in one of two semicylindrical regions of the workpiece, the two semicylindrical regions having a common boundary plane extending through a center of the workpiece and parallel to the processing-feed direction; a first intermediate area included in the one of the two semicylindrical regions and closer to the center of the workpiece than the first outer area; a first inner area included in the one of the two semicylindrical regions and closer to the center of the workpiece than the first intermediate area; a second outer area included in the other one of the two semicylindrical regions; a second intermediate area included in the other one of the two semicylindrical regions and closer to the center of the workpiece than the second outer area; and a second inner area included in the other one of the two semicylindrical regions and closer to the center of the workpiece than the second intermediate area. Furthermore, the peel-off layer forming step includes the steps of forming a peel-off layer initially in the first outer area and forming a peel-off layer finally in the first inner area or the second inner area.

The peel-off layer forming step preferably includes the step of forming peel-off layers in a sequence of the first outer area, the first intermediate area, the first inner area, the second outer area, the second intermediate area, and the second inner area.

Alternatively, the peel-off layer forming step preferably includes the step of forming peel-off layers in a sequence of the first outer area, the second outer area, the first intermediate area, the second intermediate area, the first inner area, and the second inner area.

Alternatively, the peel-off layer forming step preferably includes the step of forming peel-off layers in a sequence of the first outer area, the first intermediate area, the second outer area, the second intermediate area, the first inner area, and the second inner area.

According to the present invention, a peel-off layer is finally formed in an area, i.e., the first inner area or the second inner area, in the workpiece that is closer to the center of the workpiece among the plurality of areas along processing-feed directions. Since the workpiece has a cylindrical shape, the second inner area is wider than the other areas, e.g., the second outer area, in which the peel-off layers are formed.

Consequently, when the peel-off layer is finally formed in the second inner area, the internal stresses in the workpiece are dispersed in a wider range than when the peel-off layer is finally formed in the second outer area. In this case, cracks that are large thicknesswise of the workpiece are prevented from being developed from modified regions contained in the peel-off layer. Therefore, the amount of workpiece material to be disposed of in the planarization of a substrate separated from the workpiece is reduced, resulting in increased productivity for the manufacture of the substrate.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
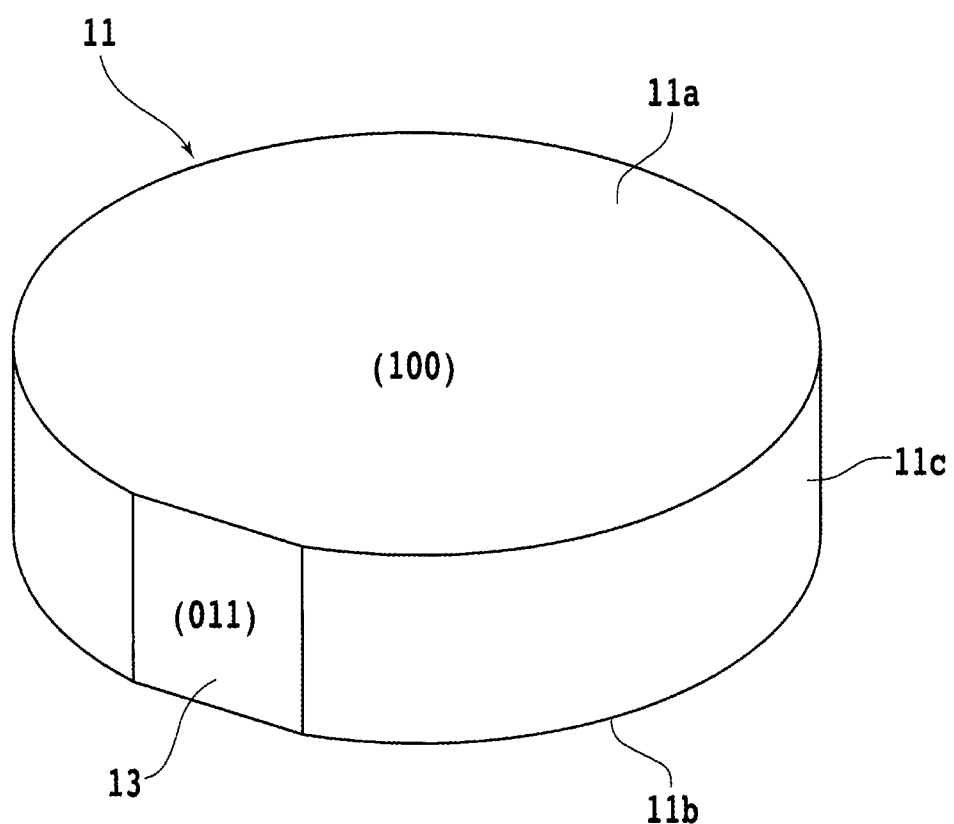
FIG. 1 is a schematic perspective view illustrating an ingot by way of example.
Figure 2:
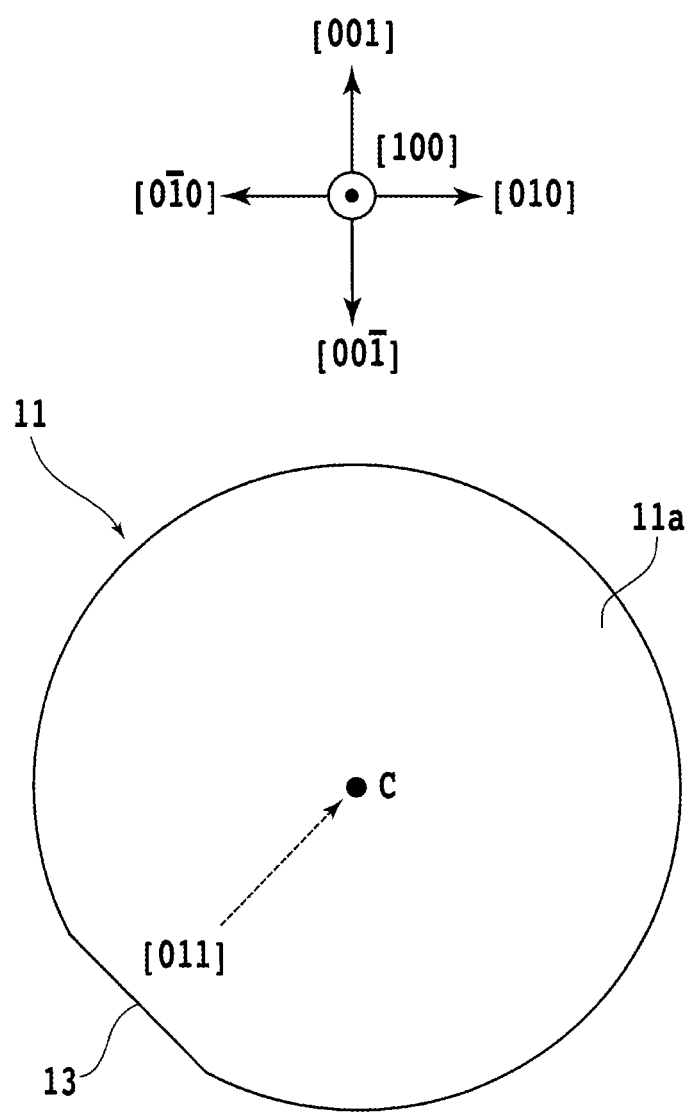
FIG. 2 is a schematic plan view of the ingot illustrated in FIG. 1.

Preferred embodiments of the present invention will be described below with reference to the accompanying drawings. FIG. 1 schematically illustrates in perspective a cylindrical ingot of monocrystalline silicon by way of example, and FIG. 2 schematically illustrates the ingot in plan. FIG. 1 also illustrates crystal planes of monocrystalline silicon that are exposed on flat surfaces of the ingot. FIG. 2 also illustrates crystal orientations of monocrystalline silicon of the ingot.

The ingot, denoted by 11, illustrated in FIGS. 1 and 2, is shaped as a cylinder of monocrystalline silicon where a particular crystal plane, given herein as a crystal plane (100) for the sake of convenience, included in crystal planes {100} is exposed on each of a circular face side, i.e., a first surface, 11a and a circular reverse side, i.e., a second surface, 11b of the ingot 11. Stated otherwise, the ingot 11 is shaped as a cylinder of monocrystalline silicon where a line perpendicular to each of the face side 11a and the reverse side 11b, i.e., a crystal axis of the ingot 11, extends along a crystal orientation [100].

Although the ingot 11 is manufactured such that the crystal plane (100) is exposed on each of the face side 11a and the reverse side 11b, a plane slightly inclined to the crystal plane (100) may be exposed on each the face side 11a and the reverse side 11b due to processing errors, etc. that may have occurred in the manufacturing process. Specifically, a plane that is inclined to the crystal plane (100) by an angle of 1° or less may be exposed on each the face side 11a and the reverse side 11b of the ingot 11. In other words, the crystal axis of the ingot 11 may extend along a direction that is inclined to the crystal orientation [100] by an angle of 1° or less.

The ingot 11 has an orientation flat 13 defined on a side surface 11c thereof. The ingot 11 has a center C positioned on a particular crystal orientation, given herein as a crystal orientation [011] for the sake of convenience, included in crystal orientations <110> as viewed from the orientation flat 13. A crystal plane (011) of monocrystalline silicon is exposed on the orientation flat 13.

Figure 3:
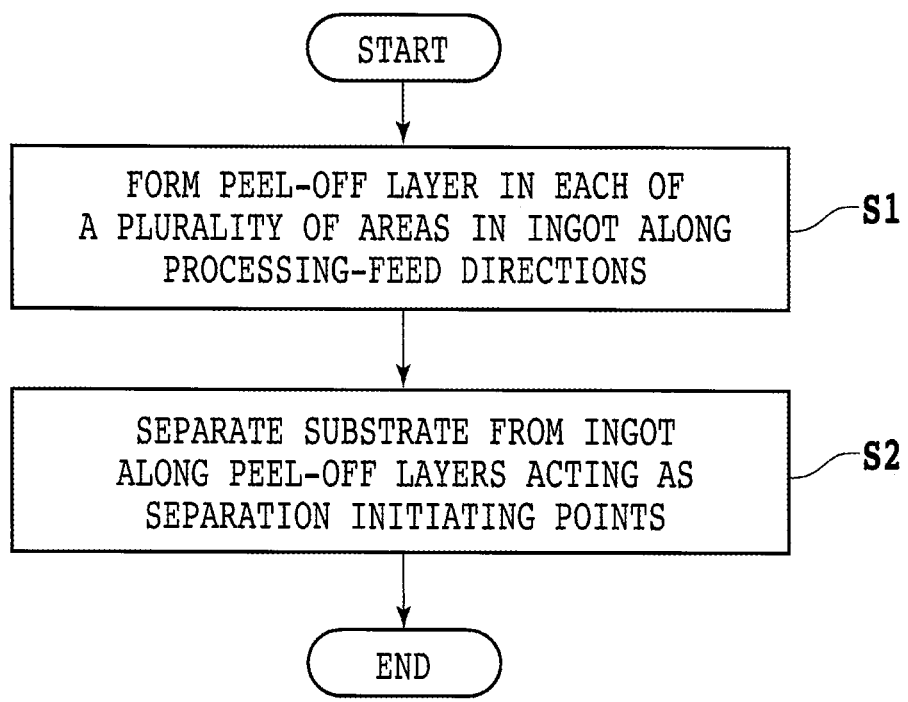
FIG. 3 is a flowchart of a method of manufacturing a substrate from a workpiece according to an embodiment of the present invention.

FIG. 3 is a flowchart of a method of manufacturing a substrate from the ingot 11 as a workpiece according to an embodiment of the present invention. According to the method, simply stated, after peel-off layers have been formed in the ingot 11 fully thereacross by a laser processing apparatus, a substrate is separated from the ingot 11 along the peel-off layers that act as separation initiating points.

Figure 4:
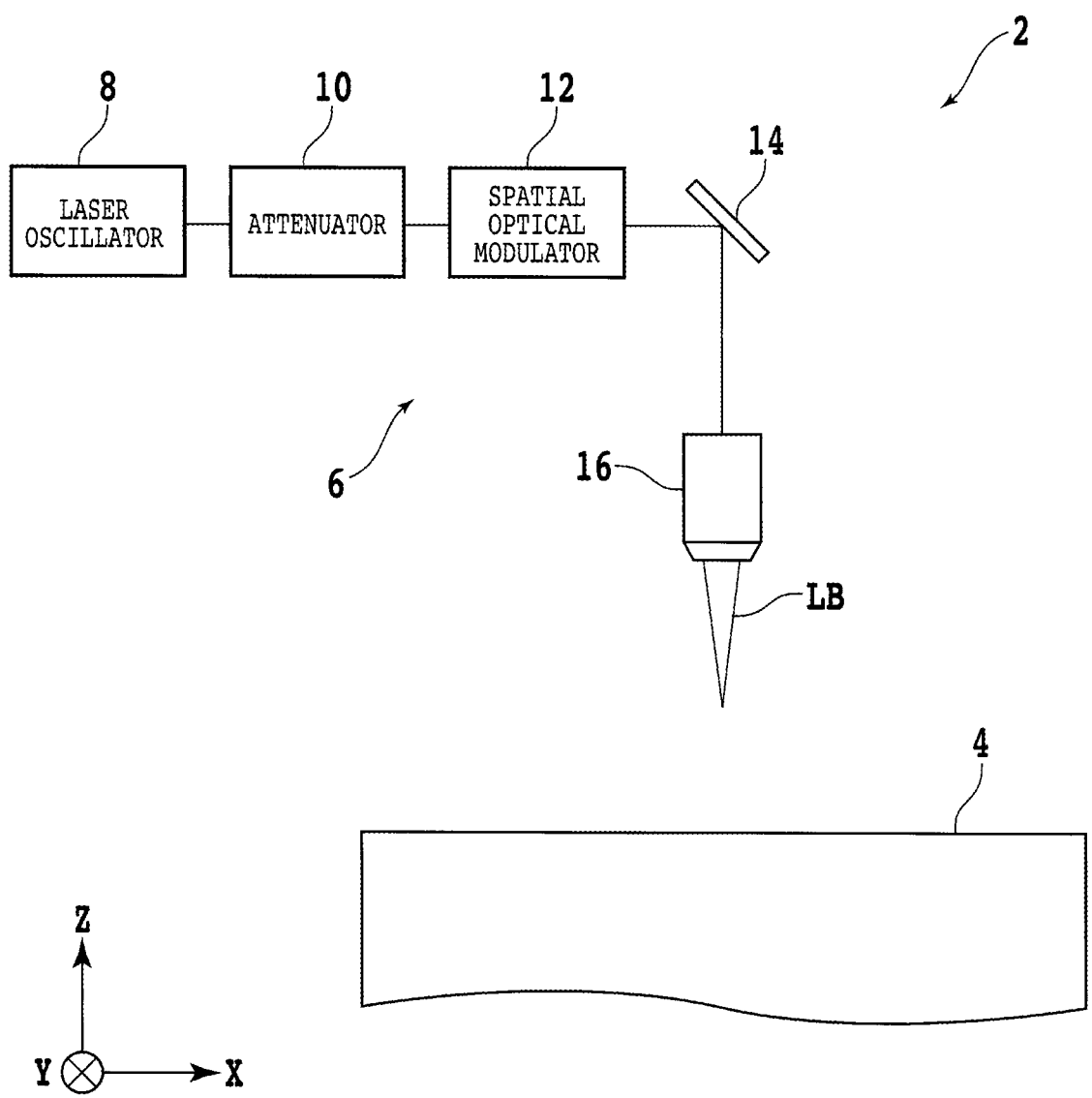
FIG. 4 is a schematic side elevational view illustrating a laser processing apparatus by way of example.

FIG. 4 schematically illustrates, in a side elevation, a laser processing apparatus by way of example that is used to form a peel-off layer in the ingot 11. As illustrated in FIG. 4, an X-axis direction indicated by the arrow X extends along an X-axis, and a Y-axis direction indicated by the arrow Y extends along a Y-axis perpendicular to the X-axis. The X-axis direction and the Y-axis direction extend perpendicularly to each other on a horizontal plane. A Z-axis direction indicated by the arrow Z extends along a Z-axis perpendicular to the X-axis and the Y-axis. The Z-axis direction extends perpendicularly to the X-axis direction and the Y-axis direction. In FIG. 4, some components of the laser processing apparatus are illustrated in block form.

The laser processing apparatus, generally denoted by 2 in FIG. 4, has a cylindrical holding table 4. The holding table 4 has a circular upper surface as a holding surface for holding the ingot 11 thereon. The circular upper surface is wider than the face side 11a and the reverse side 11b of the ingot 11. The holding surface lies parallel to the X-axis and the Y-axis or the horizontal plane. The holding table 4 includes a cylindrical porous plate, not depicted, whose upper surface is exposed on the holding surface of the holding table 4.

The porous plate is fluidly communicated with a suction source, not depicted, such as a vacuum pump, through a fluid channel or the like, not depicted, defined in the holding table 4. When the suction source is actuated, it generates a negative pressure and the negative pressure is transmitted through the fluid channel to a space in the vicinity of the holding surface of the holding table 4, thereby holding the ingot 11 under suction on the holding surface.

The laser processing apparatus 2 also has a laser beam applying unit 6 disposed above the holding table 4. The laser beam applying unit 6 includes a laser oscillator 8 that has a laser medium of Nd:YAG or the like for emitting a pulsed laser beam LB having a wavelength of 1064 nm, for example, transmittable through the material, i.e., monocrystalline silicon, of the ingot 11.

The laser beam LB has its output power level adjusted by an attenuator 10 and is then applied to a spatial optical modulator 12. The spatial optical modulator 12 branches the adjusted laser beam LB into a plurality of laser beams LB. Specifically, the spatial optical modulator 12 branches the adjusted laser beam LB into a plurality of, e.g., five, laser beams LB that will have respective focused spots, in the ingot 11, arrayed at equal intervals along the Y-axis direction after being emitted from an emission head 16 to be described below.

The laser beams LB emitted from the spatial optical modulator 12 are applied to and reflected by a mirror 14 to travel to the emission head 16. The emission head 16 houses therein a condensing lens, not depicted, for converging the laser beams LB. The laser beams LB converged by the condensing lens are emitted toward the holding surface of the holding table 4.

The emission head 16 of the laser beam applying unit 6 is coupled to a moving mechanism, not depicted. The moving mechanism includes ball screws, etc. for moving the emission head 16 in the X-axis direction and a direction opposite the X-axis direction, the Y-axis direction and a direction opposite the Y-axis direction, and/or the Z-axis direction and a direction opposite the Z-axis direction. The moving mechanism is actuated to adjust the positions or coordinates of the focused spots of the laser beams LB emitted from the emission head 16 in the X-axis direction, the Y-axis direction, and/or the Z-axis direction.

According to the method of manufacturing a substrate illustrated in FIG. 3, a peel-off layer is formed in each of a plurality of areas extending along processing-feed directions in the ingot 11 by the laser processing apparatus 2 (peel-off layer forming step S1). In the laser processing apparatus 2, the X-axis direction and the direction opposite the X-axis direction are established as the processing-feed directions, for example. For performing the peel-off layer forming step S1, the ingot 11 with its face side 11a facing upwardly is placed and held on the holding table 4.

Figure 5:
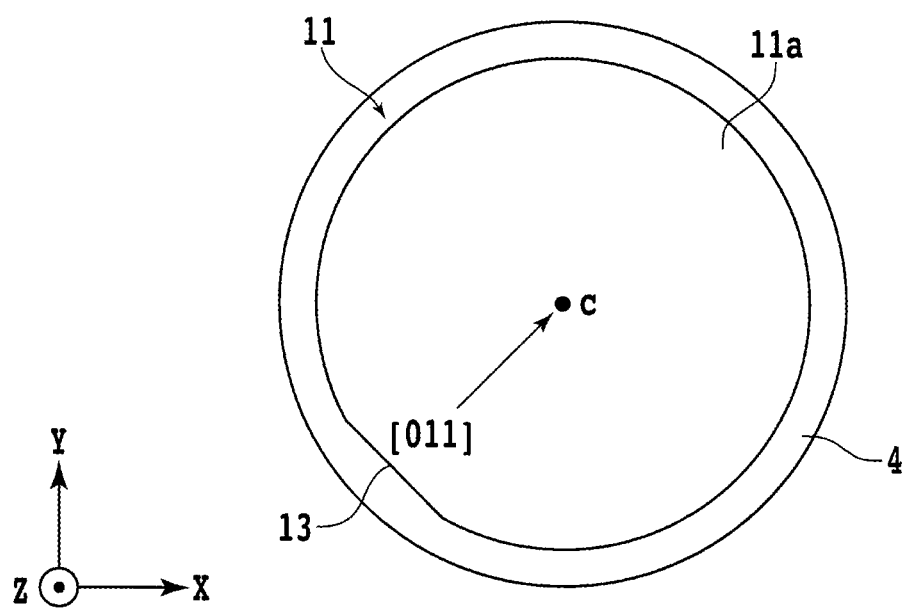
FIG. 5 is a schematic plan view of a holding table of the laser processing apparatus for holding an ingot thereon.

FIG. 5 schematically illustrates in plan the holding table 4 with the ingot 11 held thereon. The ingot 11 is held on the holding table 4 such that the direction from the orientation flat 13 toward the center C of the ingot 11, i.e., the crystal orientation [011], is inclined to the X-axis and the Y-axis by an angle of 45°. For example, the ingot 11 is held on the holding table 4 such that the ingot 11 has a crystal orientation [010] parallel to the X-axis and a crystal orientation [001] parallel to the Y-axis.

Then, the moving mechanism moves the emission head 16 such that an area in the ingot 11 at an end side of the ingot 11 in the Y-axis direction is positioned in the X-axis direction as viewed from the emission head 16, as viewed in plan. Then, the moving mechanism lifts or lowers the emission head 16 to position the focused spots of the laser beams LB at a height within the ingot 11.

As described above, the laser beam LB from the laser oscillator 8 is branched by the spatial optical modulator 12 into a plurality of, e.g., five, laser beams LB that will have respective focused spots in the ingot 11 arrayed at equal intervals along the Y-axis after being emitted from the emission head 16 to the ingot 11. With the focused spots of the laser beams LB being positioned within the ingot 11, the laser beams LB are applied from the emission head 16 to the ingot 11 while the emission head 16 is being moved.

Figure 6:
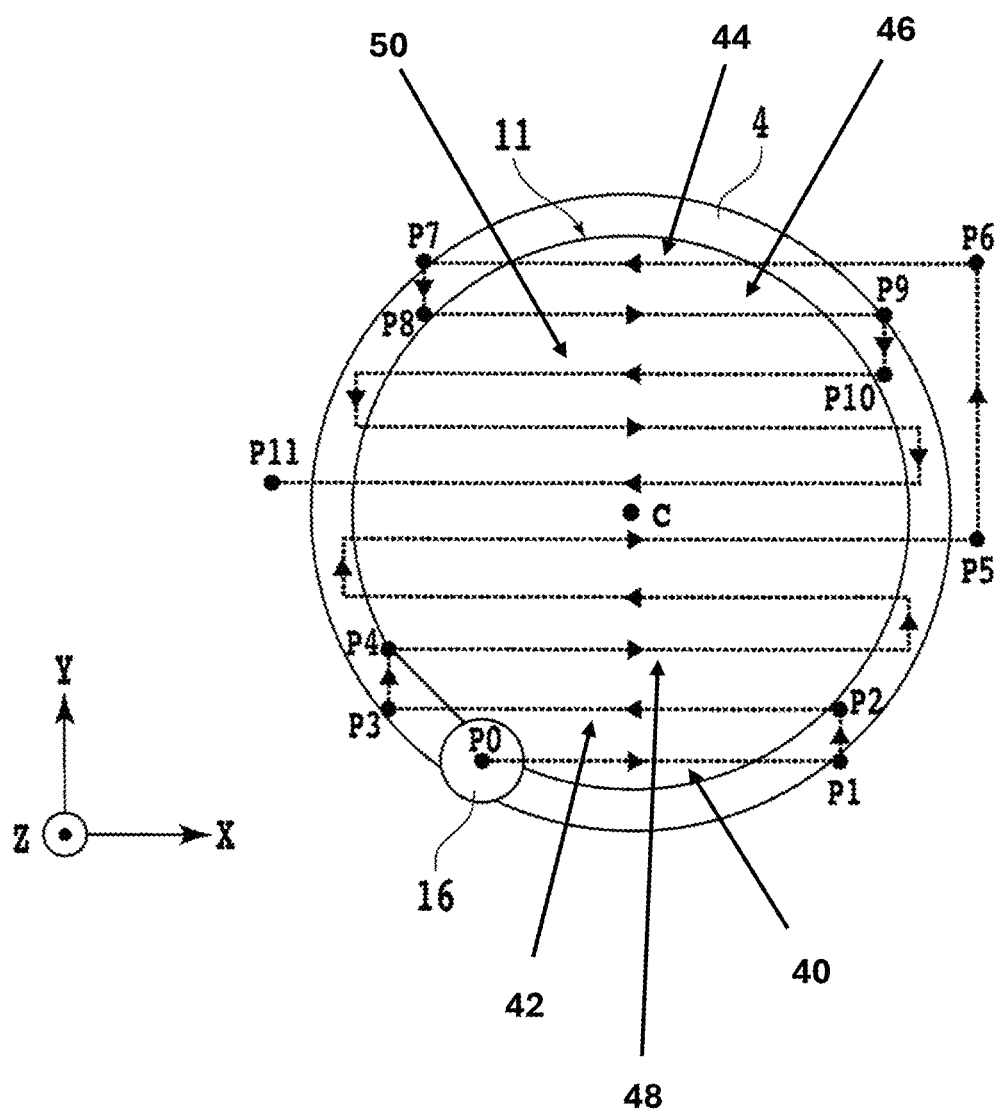
FIG. 6 is a schematic plan view illustrating an example of a path traced by an emission head as it moves in a peel-off layer forming step of the method.

FIG. 6 schematically illustrates in plan an example of a path traced by the emission head 16 as it moves in the peel-off layer forming step S1. In the peel-off layer forming step S1, the laser beams LB are applied from the emission head 16 to the ingot 11 while the emission head 16 is being moved along a path indicated by the dotted lines in FIG. 6.

Specifically, while the emission head 16 is applying the laser beams LB to the ingot 10, the emission head 16 is moved in the X-axis direction, i.e., one of the processing-feed directions, across the ingot 11 from one end to the other thereof in the X-axis direction, as viewed in plan. Specifically, while the emission head 16 is applying the laser beams LB to the ingot 10, the emission head 16 is moved linearly until its center goes from a position P0 to a position P1 illustrated in FIG. 6.

Figure 7:
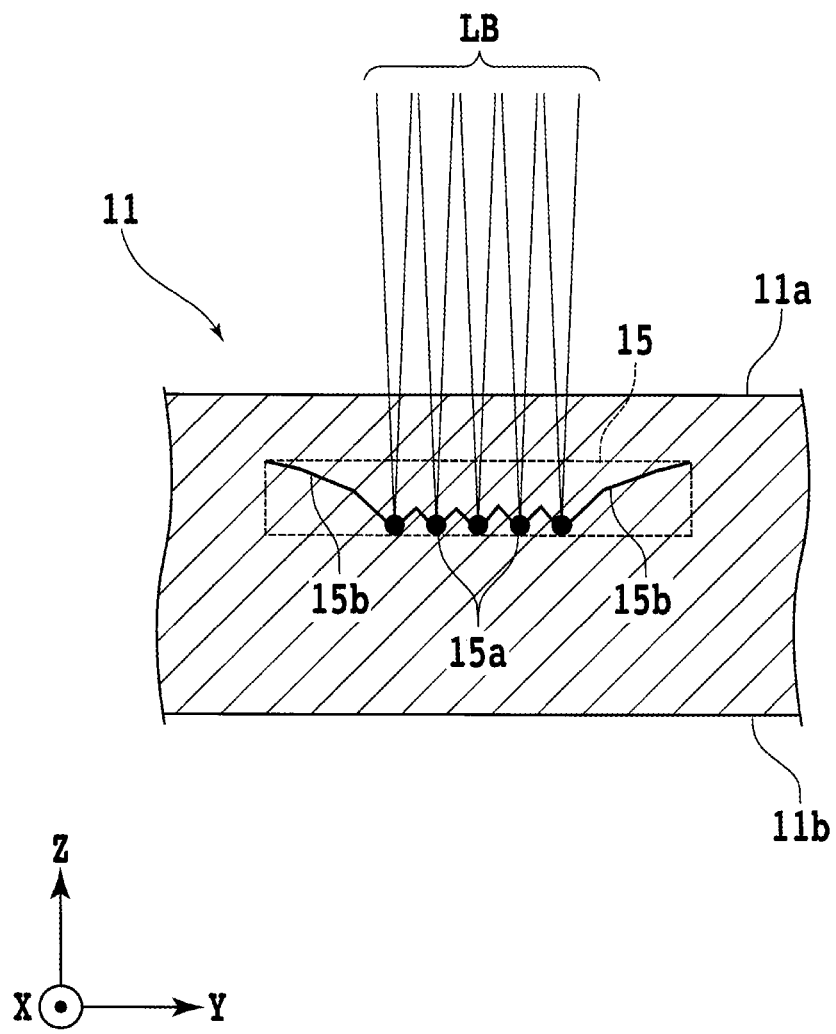
FIG. 7 is an enlarged schematic fragmentary cross-sectional view illustrating the manner in which laser beams are applied to an ingot.

FIG. 7 schematically illustrates in enlarged fragmentary cross section the manner in which the laser beams LB are applied to the ingot 11. The laser beams LB thus applied to the ingot 11 form, in the ingot 11, modified regions 15a where the crystalline structure of the material, i.e., monocrystalline silicon, of the ingot 11 is disrupted around the focused spots in the ingot 11. The modified regions 15a are arrayed along the Y-axis. As the modified regions 15a are formed in the ingot 11, the volume of the ingot 11 increases.

Furthermore, the modified regions 15a formed in the ingot 11 produce internal stresses in the ingot 11. In the ingot 11, cracks 15b are developed from the respective modified regions 15a, relaxing the internal stresses. The modified regions 15a formed around the focused spots and the cracks 15b developed from the respective modified regions 15a jointly make up a peel-off layer 15 in an area in the ingot 11 at one end side thereof in the Y-axis direction, i.e., a first outer area.

Then, the emission head 16 is moved in the Y-axis direction by a distance larger than the width of the peel-off layer 15 along the Y-axis direction. Specifically, the emission head 16 is moved linearly until its center goes from the position P1 to a position P2 illustrated in FIG. 6.

Then, while the emission head 16 is applying the laser beams LB to the ingot 10, the emission head 16 is moved in the direction opposite the X-axis direction, i.e., the other of the processing-feed directions, across the ingot 11 from the other end to one end thereof in the X-axis direction, as viewed in plan. Specifically, while the emission head 16 is applying the laser beams LB to the ingot 10, the emission head 16 is moved linearly until its center goes from the position P2 to a position P3 illustrated in FIG. 6.

The laser beams LB thus applied to the ingot 11 form another peel-off layer 15 in an area, i.e., a first intermediate area 42, in the ingot 11 that is closer to the center C of the ingot 11 than the first outer area 40. Then, the emission head 16 is moved in the Y-axis direction by a distance larger than the width of the peel-off layer 15 along the Y-axis direction. Specifically, the emission head 16 is moved linearly until its center goes from the position P3 to a position P4 illustrated in FIG. 6.

Then, peel-off layers 15 are formed in all areas, i.e., first inner areas, that exist between the first intermediate area and the center C of the ingot 11. Specifically, while the emission head 16 is applying the laser beams LB to the ingot 10, the emission head 16 is repeatedly moved linearly in alternately opposite directions until its center goes from the position P4 to a position P5 illustrated in FIG. 6.

In this manner, peel-off layers 15 are formed generally entirely in one of two semicylindrical regions of the ingot 11 that have a common boundary plane extending through the center C of the ingot 11 and parallel to the X-axis direction, i.e., the processing-feed directions. Then, the moving mechanism moves the emission head 16 in the Y-axis direction such that an area in the ingot 11 at the other end side of the ingot 11 in the Y-axis direction is positioned in the direction opposite the X-axis direction as viewed from the emission head 16, as viewed in plan. Specifically, the emission head 16 is moved linearly until its center goes from the position P5 to a position P6 illustrated in FIG. 6.

Then, while the emission head 16 is applying the laser beams LB to the ingot 10, the emission head 16 is moved in the direction opposite the X-axis direction, i.e., the other of the processing-feed directions, across the ingot 11 from the other end to the one end thereof in the X-axis direction, as viewed in plan. Specifically, while the emission head 16 is applying the laser beams LB to the ingot 10, the emission head 16 is moved linearly until its center goes from the position P6 to a position P7 illustrated in FIG. 6.

The laser beams LB applied from the emission head 16 thus moving form a peel-off layer 15 in an area, e.g., a second outer area 44, in the ingot 11 at the other end thereof in the Y-axis direction. Then, the emission head 16 is moved in the direction opposite the Y-axis direction by a distance larger than the width of the peel-off layer 15 along the Y-axis direction. Specifically, the emission head 16 is moved linearly until its center goes from the position P7 to a position P8 illustrated in FIG. 6.

Then, while the emission head 16 is applying the laser beams LB to the ingot 10, the emission head 16 is moved in the X-axis direction, i.e., the one of the processing-feed directions, across the ingot 11 from the one end to the other end thereof in the X-axis direction, as viewed in plan. Specifically, while the emission head 16 is applying the laser beams LB to the ingot 10, the emission head 16 is moved linearly until its center goes from the position P8 to a position P9 illustrated in FIG. 6.

A peel-off layer 15 is now formed in an area, i.e., a second intermediate area 46, in the ingot 11 that is closer to the center C of the ingot 11 than the second outer area 44. Then, the emission head 16 is moved in the direction opposite the Y-axis direction by a distance larger than the width of the peel-off layer 15 along the Y-axis direction. Specifically, the emission head 16 is moved linearly until its center goes from the position P9 to a position P10 illustrated in FIG. 6.

Then, peel-off layers 15 are formed in all areas, i.e., second inner areas, that exist between the second intermediate area and the center C of the ingot 11. Specifically, while the emission head 16 is applying the laser beams LB to the ingot 10, the emission head 16 is repeatedly moved linearly in alternately opposite directions until its center goes from the position P10 to a position P11 illustrated in FIG. 6.

In this manner, peel-off layers 15 are formed generally entirely in the other of the two semicylindrical regions of the ingot 11. Specifically, the peel-off layer 15 is formed in each of the areas in the ingot 11 that extend along the processing-feed directions and that are present at generally equal depths from the face side 11a of the ingot 11.

FIG. 6 illustrates, for the sake of convenience, the path traced by the emission head 16 for forming the five peel-off layers 15 parallel to each other in each of the semicylindrical regions of the ingot 11. However, the number of the peel-off layers 15 formed in each of the semicylindrical regions of the ingot 11 is not limited to five. If even-numbered peel-off layers 15 are to be formed in each of the semicylindrical regions of the ingot 11, then the emission head 16 is moved in the opposite directions along the X-axis for forming peel-off layers 15 in the other of the semicylindrical regions, to the directions illustrated in FIG. 6.

Figure 8A:
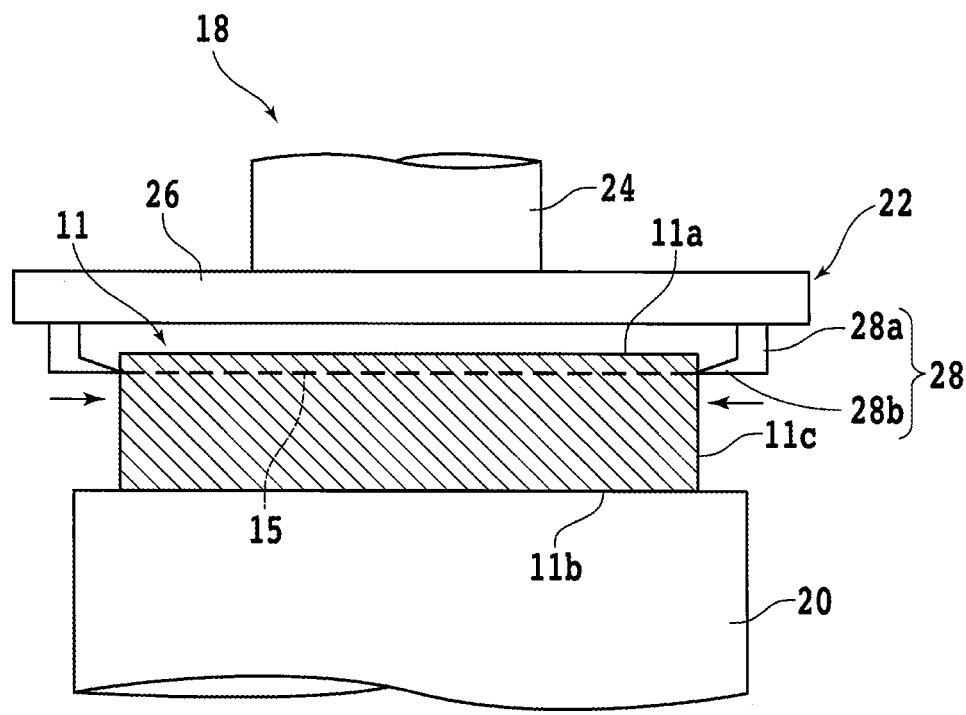
FIG. 8A is a schematic side elevational view, partly in cross section, illustrating an example of a separating step.
Figure 8B:
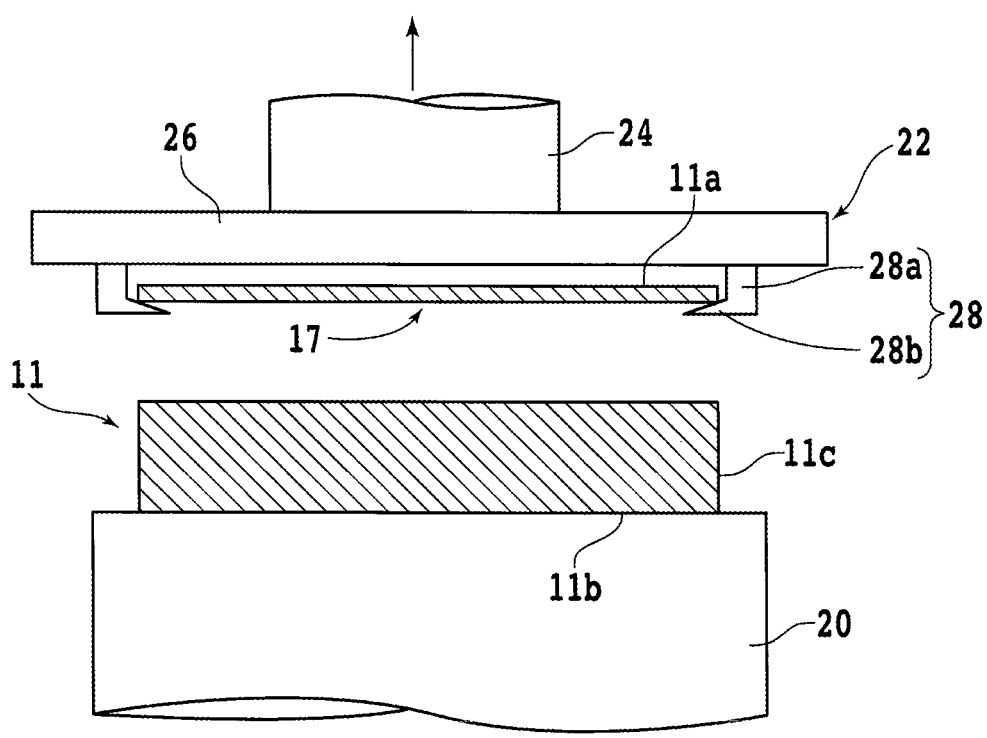
FIG. 8B is a schematic side elevational view, partly in cross section, illustrating the example of the separating step.

The peel-off layer forming step S1 is now completed. Then, a substrate is separated from the ingot 11 along the peel-off layers 15 that act as separation initiating points (separating step S2). FIGS. 8A and 8B schematically illustrate in a side elevation, partly in cross section, an example of the manner in which a substrate is separated from the ingot 11 in the separating step S2.

The separating step S2 is carried out by a separating apparatus 18 illustrated in FIGS. 8A and 8B. As illustrated in FIGS. 8A and 8B, the separating apparatus 18 has a cylindrical holding table 20 for holding thereon the ingot 11 with the peel-off layers 15 formed therein. The holding table 20 has a circular upper surface, i.e., a holding surface, wider than the face side 11a and the reverse side 11b of the ingot 11, for holding the ingot 11 thereon.

A cylindrical porous plate, not depicted, is exposed on the holding surface of the holding table 20. The porous plate is fluidly communicated with a suction source, not depicted, such as a vacuum pump, through a fluid channel or the like, not depicted, defined in the holding table 20. When the suction source is actuated, it generates a negative pressure and the negative pressure is transmitted through the fluid channel to a space in the vicinity of the holding surface of the holding table 20, thereby holding the ingot 11 under suction on the holding surface.

A separating unit 22 is disposed above the holding table 20. The separating unit 22 has a cylindrical support member 24 having an upper portion to which there are coupled a ball-screw-type lifting and lowering mechanism, not depicted, and a rotary actuator such as an electric motor, for example. When the ball-screw-type lifting and lowering mechanism is actuated, it selectively lifts and lowers the separating unit 22. When the rotary actuator is actuated, it rotates the support member 24 around a straight rotational axis passing through the center of the support member 24 and extending perpendicularly to the holding surface of the holding table 20.

The support member 24 has a lower end fixed centrally to an upper portion of a disk-shaped base 26. A plurality of movable members 28 are mounted on a lower surface of an outer circumferential portion of the base 26 and angularly spaced at generally equal intervals circumferentially around the base 26. The movable members 28 have respective plate-shaped vertical portions 28a extending downwardly from the lower surface of the base 26.

The vertical portions 28a have respective upper ends coupled to actuators such as air cylinders, not depicted, housed in the base 26. When the actuators are actuated, they move the movable members 28 in radial directions of the base 26. The movable members 28 also include respective plate-shaped wedges 28b extending radially inwardly from respective inner sides of lower end portion of the vertical portions 28a. The wedges 28b are tapered such that they are progressively thinner toward their pointed distal ends.

The separating apparatus 18 operates to carry out the separating step S2 according to the following sequence of events. First, the ingot 11 is placed on the holding table 20 such that the center of the reverse side 11b of the ingot 11 with the peel-off layers 15 formed therein and the center of the holding surface of the holding table 20 are aligned with each other.

Then, the suction source fluidly communicated with the porous plate exposed on the holding surface is actuated to hold the ingot 11 under suction on the holding table 20. Thereafter, the actuators coupled to the movable members 28 is actuated to position the movable members 28 on a radially outer portion of the base 26.

Then, the lifting and lowering mechanism is operated to position the pointed distal ends of the wedges 28b of the respective movable members 28 at a height horizontally aligned with the peel-off layers 15 formed in the ingot 11. Then, the actuators are operated to drive the wedges 28b into the side surface 11c of the ingot 11 (see FIG. 8A). Then, the rotary actuator is operated to rotate the wedges 28b driven in the side surface 11c of the ingot 11.

Thereafter, the lifting and lowering mechanism is operated so as to lift the wedges 28b (see FIG. 8B). When the wedges 28b are thus lifted after being driven into the side surface 11c of the ingot 11 and rotated, the cracks 15b contained in the peel-off layers 15 are further developed. As a result, a portion of the ingot 11 closer to the face side 11a of the ingot 11 and a remaining portion of the ingot 11 closer to the reverse side 11b of the ingot 11 are separated from each other along the peel-off layers 15 that act as separation initiating points. The separated portion of the ingot 11 closer to the face side 11a is now manufactured as a substrate 17 from the ingot 11.

If the portion of the ingot 11 closer to the face side 11a of the ingot 11 and the remaining portion of the ingot 11 closer to the reverse side 11b of the ingot 11 are separated from each other at the time the wedges 28b are driven into the side surface 11c of the ingot 11, then the wedges 28b may not be rotated. The actuators and the rotary actuator may be operated simultaneously to drive the wedges 28b into the rotating side surface 11c of the ingot 11.

In the method of manufacturing the substrate 17 from the ingot 11 according to the present embodiment, the peel-off layer 15 is finally formed in the area, i.e., the second inner area, in the ingot 11 that is close to the center C of the ingot 11, among the areas in the ingot 11 along the processing-feed directions. Since the ingot 11 has a cylindrical shape, the second inner area is wider than the other areas, e.g., the second outer area, in which the peel-off layers 15 are formed.

Consequently, when the peel-off layer 15 is finally formed in the second inner area, the internal stresses in the ingot 11 are dispersed in a wider range than when the peel-off layer 15 is finally formed in the second outer area. In this case, the cracks 15b that are large thicknesswise of the ingot 11 are prevented from being developed from the modified regions 15a contained in the peel-off layer 15. Therefore, the method is effective to reduce the amount of ingot material to be disposed of in the planarization of the substrate 17, resulting in increased productivity for the manufacture of the substrate 17.

In the above method of manufacturing a substrate, furthermore, the peel-off layers 15 are formed in the ingot 11 by moving the focused spots arrayed along the Y-axis, i.e., the crystal orientation [001], and the ingot 11 relatively to each other along the X-axis, the crystal orientation [010]. The method is thus more effective to reduce the amount of ingot material to be disposed of in the planarization of the substrate 17, resulting in further increased productivity for the manufacture of the substrate 17.

The above advantages will be described in greater detail below. Generally, monocrystalline silicon is most likely to cleave along a particular crystal plane included in crystal planes {111}, and is second most likely to cleave along a particular crystal plane included in crystal planes {110}. Therefore, when modified regions are formed along a particular crystal orientation, e.g., a crystal orientation [011], included in crystal orientations <110> of monocrystalline silicon of an ingot 11, for example, many cracks are developed from the modified regions along the particular crystal plane included in the crystal planes {111}.

On the other hand, when a plurality of modified regions are formed in an area along a particular crystal orientation included in crystal orientations <100> of monocrystalline silicon such that the modified regions are arrayed along a direction perpendicular to the direction in which the area extends, as viewed in plan, many cracks are developed from the modified regions along a crystal plane parallel to the direction in which the area extends, among crystal planes {N10} (N represents a natural number of 10 or less).

For example, when the modified regions 15a arrayed along the crystal orientation [001] are formed in the area along the crystal orientation [010], many cracks are developed from the modified regions 15a along a crystal plane parallel to the crystal orientation [010] among the crystal planes {N10} (N represents a natural number 10 or less).

Specifically, when the modified regions 15a are thus formed, cracks are likely to develop along the following crystal planes.

$$(101),(201),(301),(401),(501),(601),(701),(801),(901),\\(10\underline{0}1) \quad [\text{Math. 1}]$$

$$(\bar{1}01),(\bar{2}01)(\bar{3}01),(\bar{4}01),(\bar{5}01),(\bar{6}01),(\bar{7}01),(\bar{8}01),(\bar{9}01),(\overline{10}01) \quad [\text{Math. 2}]$$

The angle that the crystal plane (100) exposed on the face side 11a and the reverse side 11b of the ingot 11 forms with crystal plane parallel to the crystal orientation [010] among the crystal planes {N10} is 45° or less. On the other hand, the angle that the crystal plane (100) forms with the particular crystal plane included in the crystal planes {111} is approximately 54.7°.

Therefore, according to the above method of manufacturing a substrate, the peel-off layer 15 tends to be wider and thinner than when a plurality of modified regions are formed in an area along the crystal orientation [011] of monocrystalline silicon as an array along a direction perpendicular to the direction in which the area extends. As a consequence, the method of manufacturing a substrate is thus more effective to reduce the amount of ingot material to be disposed of in the manufacture of the substrate 17 from the ingot 11, resulting in further increased productivity for the manufacture of the substrate 17.

The method of manufacturing a substrate as described above represents an aspect of the present invention, and the present invention is not limited to the above described method. An ingot used to manufacture a substrate according to the present invention is not limited to the ingot 11 illustrated in FIGS. 1, 2, etc. Specifically, according to the present invention, a substrate may be manufactured from an ingot of monocrystalline silicon where a crystal plane not included in the crystal planes {100} is exposed in the face and reverse sides of the ingot.

According to the present invention, moreover, a substrate may be manufactured from a cylindrical ingot having a notch defined in a side surface thereof. Alternatively, according to the present invention, a substrate may be manufactured from a cylindrical ingot that is free of an orientation flat and a notch in a side surface thereof. According to the present invention, furthermore, a substrate may be manufactured from a cylindrical ingot made of a semiconductor material other than silicon, such as silicon carbide or the like.

The structure of a laser processing apparatus that can be used in the present invention is not limited to the structure of the laser processing apparatus 2 described above. According to the present invention, the method of manufacturing a substrate may be carried out using a laser processing apparatus including a moving mechanism for moving the holding table 4 in the X-axis directions, the Y-axis directions, and/or the Z-axis directions.

Specifically, a laser processing apparatus that can be used in the present invention is not limited to any structural details insofar as the holding table 4 for holding the ingot 11 thereon and the emission head 16 of the laser beam applying unit 6 for applying the laser beams LB to the ingot 11 can be moved relatively to each other along the X-axis, the Y-axis, and the Z-axis.

In the peel-off layer forming step S1 according to the present invention, the sequence of forming peel-off layers 15 in a plurality of areas in the ingot 11 along the processing-feed directions is not limited to the sequence described above, i.e., the sequence of forming peel-off layers 15 in the first outer area, the first intermediate area, the first inner area, the second outer area, the second intermediate area, and the second inner area. According to the present invention, in other words, the path traced by the emission head 16 for applying the laser beams LB to the ingot 11 is not limited to the path indicated by the dotted lines in FIG. 6.

Figure 9A:
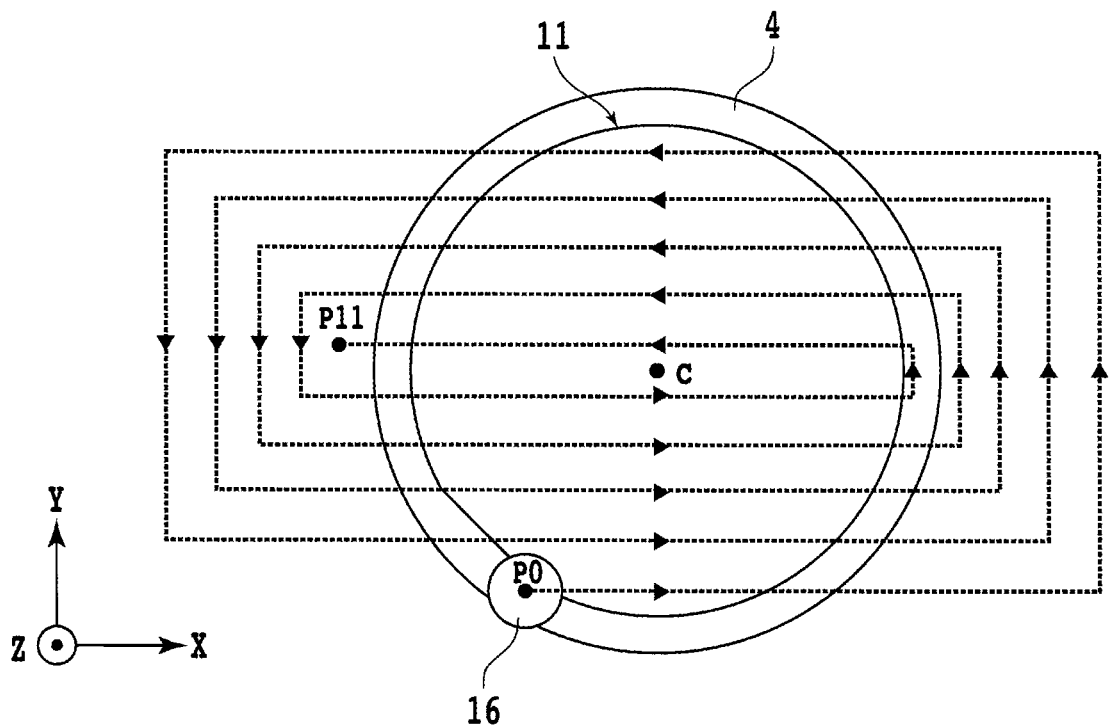
FIG. 9A is a schematic plan view illustrating another example of the path traced by the emission head as it moves in the peel-off layer forming step of the method.
Figure 9B:
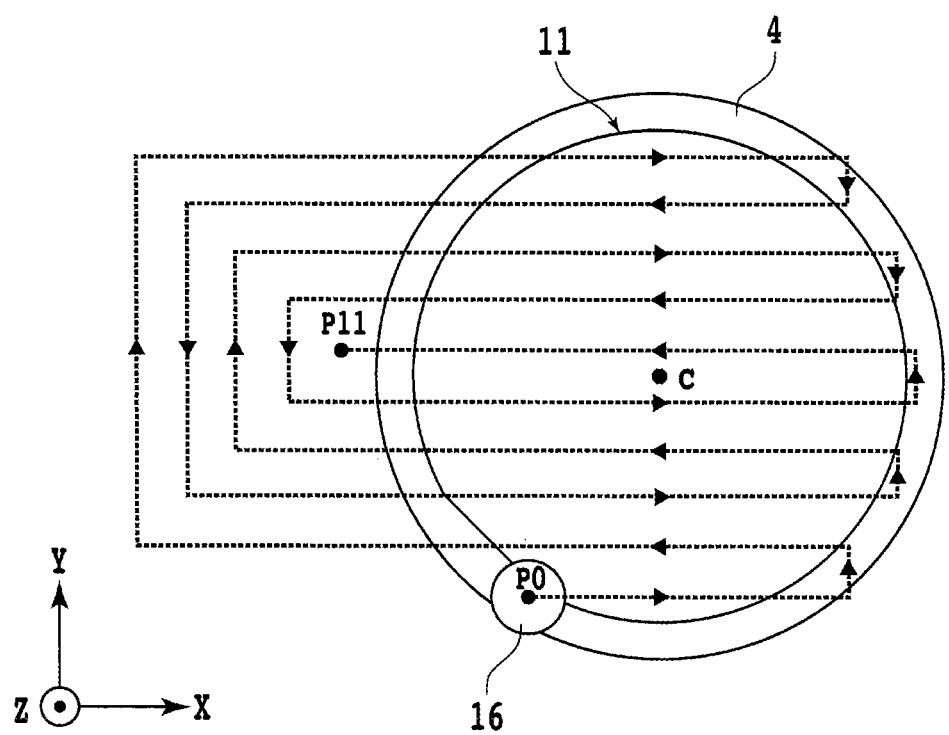
FIG. 9B is a schematic plan view illustrating still another example of the path traced by the emission head as it moves in the peel-off layer forming step of the method.

FIGS. 9A and 9B schematically illustrate in plan other examples of the path traced by the emission head 16 as it moves in the peel-off layer forming step S1. In FIG. 9A, the emission head 16 applies the laser beams LB to the ingot 11 while being moved to form one peel-off layer 15 at a time alternately in the two semicylindrical regions of the ingot 11.

As illustrated in FIG. 9A, the peel-off layers 15 are formed successively in the five areas along the processing-feed directions in each of the semicylindrical regions of the ingot 11 in a radially inward sequence from an outer area. Specifically, the peel-off layers 15 are formed successively in the sequence of the first outer area 40, the second outer area 44, the first intermediate area 42, the second intermediate area 46, the first inner area 48, and the second inner area 50.

In FIG. 9B, the emission head 16 applies the laser beams LB to the ingot 11 while being moved to form two peel-off layers 15 in a row alternately in the two semicylindrical regions of the ingot 11. Alternatively, in the peel-off layer forming step S1 according to the present invention, three or more peel-off layers 15 may be formed in a row alternately in the two semicylindrical regions of the ingot 11.

In FIG. 9B, the peel-off layers 15 are formed successively in the five areas along the processing-feed directions in each of the semicylindrical regions of the ingot 11 in a radially inward sequence from an outer area. Specifically, the peel-off layers 15 are formed successively in the sequence of the first outer area, the first intermediate area, the second outer area, the second intermediate area, the first inner area, and the second inner area.

In the peel-off layer forming step S1 according to the present invention, the peel-off layer 15 may be finally formed in the first inner area, rather than the second inner area. In the peel-off layer forming step S1 according to the present invention, for example, the peel-off layers 15 may be formed successively in the sequence of the first outer area, the first intermediate area, the second outer area, the second intermediate area, the second inner area, and the first inner area.

In FIGS. 9A and 9B, the path traced by the emission head 16 is illustrated as not overlapping and crossing each other outside of the ingot 11 for the purpose of depicting the path clearly. However, the path traced by the emission head 16 may overlap and/or cross each other outside of the ingot 11. Specifically, in the peel-off layer forming step S1 according to the present invention, the emission head 16 may be moved along a path that overlaps and/or crosses each other outside of the ingot 11 in order to minimize the path.

According to the present invention, furthermore, after the peel-off layer forming step S1 has been carried out, the peel-off layer forming step S1 may be carried out again. In this case, the densities of the modified regions 15a and the cracks 15b contained in the peel-off layer 15 that has already been formed in the ingot 11 are increased. As a result, it is easy to separate the substrate 17 from the ingot 11 in the separating step S2.

Figure 10A:
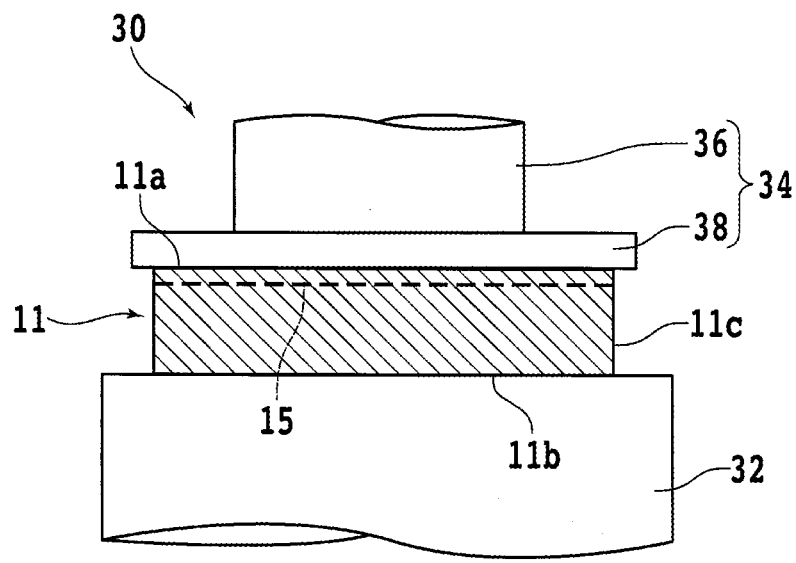
FIG. 10A is a schematic side elevational view, partly in cross section, illustrating another example of the separating step.
Figure 10B:
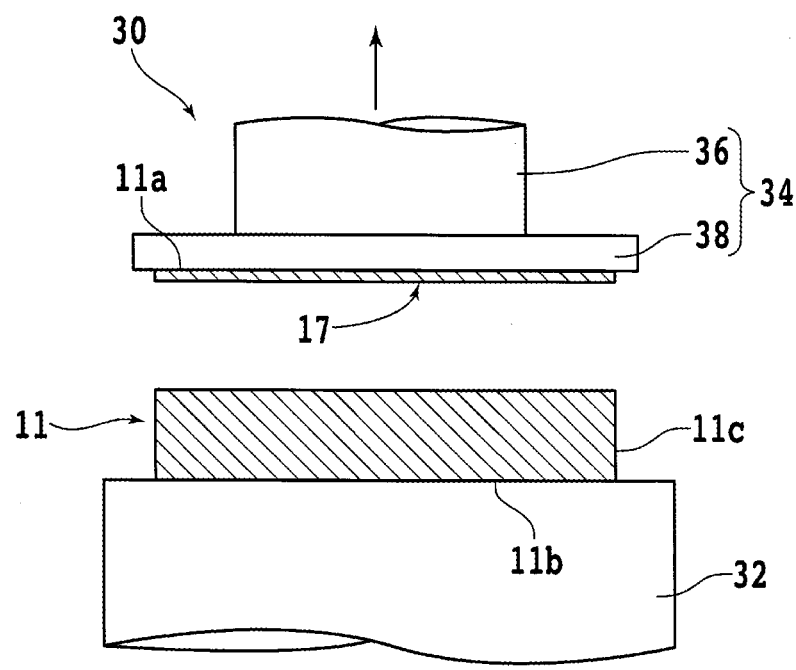
FIG. 10B is a schematic side elevational view, partly in cross section, illustrating the other example of the separating step.

The separating step S2 of the present invention may be carried out by an apparatus other than the separating apparatus 18 illustrated in FIGS. 8A and 8B. FIGS. 10A and 10B schematically illustrate in a side elevation, partly in cross section, an example of the manner in which the substrate 17 is separated from the ingot 11 according to such a modification.

A separating apparatus 30 illustrated in FIGS. 10A and 10B has a cylindrical holding table 32 for holding thereon the ingot 11 with the peel-off layers 15 formed therein. The holding table 32 has a circular upper surface as a holding surface for holding the ingot 11 thereon. The circular upper surface is wider than the face side 11a and the reverse side 11b of the ingot 11.

The holding table 32 includes a cylindrical porous plate, not depicted, whose upper surface is exposed on the holding surface of the holding table 32. The porous plate is fluidly communicated with a suction source, not depicted, such as a vacuum pump, through a fluid channel or the like, not depicted, defined in the holding table 32. When the suction source is actuated, it generates a negative pressure and the negative pressure is transmitted through the fluid channel to a space in the vicinity of the holding surface of the holding table 32, thereby holding the ingot 11 under suction on the holding surface.

A separating unit 34 is disposed above the holding table 32. The separating unit 34 has a cylindrical support member 36 having an upper portion to which there is coupled a ball-screw-type lifting and lowering mechanism, not depicted, for example. When the ball-screw-type lifting and lowering mechanism is actuated, it selectively lifts and lowers the separating unit 34.

The support member 36 has a lower end fixed centrally to an upper portion of a disk-shaped suction plate 38. The suction plate 38 has a plurality of suction ports defined in a lower surface thereof and fluidly communicated with a suction source, not depicted, such as a vacuum pump, through a fluid channel or the like, not depicted, defined in the suction plate 38. When the suction source is actuated, it generates a negative pressure and the negative pressure is transmitted through the fluid channel to a space in the vicinity of the lower surface of the suction plate 38, thereby attracting the ingot 11 under suction to the lower surface of the suction plate 38.

The separating apparatus 30 operates to carry out the separating step S2 according to the following sequence of events. First, the ingot 11 is placed on the holding table 32 such that the center of the reverse side 11b of the ingot 11 with the peel-off layers 15 formed therein and the center of the holding surface of the holding table 32 are aligned with each other.

Then, the suction source fluidly connected to the porous plate exposed on the holding surface is actuated to hold the ingot 11 under suction on the holding table 32. Thereafter, the lifting and lowering mechanism is operated to lower the separating unit 34 to bring the lower surface of the suction plate 38 into contact with the face side 11a of the ingot 11.

Then, the suction source fluidly communicated with the suction ports in the suction plate 38 is actuated to attract the face side 11a of the ingot 11 under suction to the lower surface of the suction plate 38 (see FIG. 10A). Then, the lifting and lowering mechanism is operated to lift the separating unit 34 to move the suction plate 38 away from the holding table 32 (see FIG. 10B).

At this time, upward forces are exerted on the portion of the ingot 11 closer to the face side 11a of the ingot 11 that is attracted under suction to the suction plate 38 through the suction ports. As a result, the cracks 15b contained in the peel-off layers 15 are further developed, separating the portion of the ingot 11 closer to the face side 11a of the ingot 11 and the portion of the ingot 11 closer to the reverse side 11b of the ingot 11 from each other. In other words, a substrate 17 is manufactured from the ingot 11 along the peel-off layers 15 that act as separation initiating points.

According to the present invention, in the separating step S2, ultrasonic waves may be applied to the face side 11a of the ingot 11 prior to the separation of the portion of the ingot 11 closer to the face side 11a of the ingot 11 and the portion of the ingot 11 closer to the reverse side 11b of the ingot 11 from each other. In this case, inasmuch as the cracks 15b contained in the peel-off layers 15 are further developed by the applied ultrasonic waves, the portion of the ingot 11 closer to the face side 11a of the ingot 11 and the portion of the ingot 11 closer to the reverse side 11b of the ingot 11 can be separated more easily from each other.

According to the present invention, moreover, prior to the peel-off layer forming step S1, the face side 11a of the ingot 11 may be planarized by grinding or polishing (planarizing step). The planarizing step may be carried out when a plurality of substrates are manufactured from the ingot 11. Specifically, when a substrate 17 is manufactured by being separated from the ingot 11 along the peel-off layers 15, the newly exposed surface of the ingot 11 has surface irregularities reflecting a distribution of modified regions 15a and cracks 15b contained in the peel-off layers 15.

Consequently, when a new substrate is to be manufactured from the ingot 11, it is preferable to planarize the surface of the ingot 11 prior to the peel-off layer forming step S1. The planarized surface of the ingot 11 reduces irregular reflections of the laser beams LB applied to the ingot 11 in the peel-off layer forming step S1. According to the present invention, the newly exposed surface of the substrate 17 that has been separated from the ingot 11 along the peel-off layers 15 may also be planarized by grinding or polishing.

According to the present invention, furthermore, a substrate may be manufactured from a cylindrical bare wafer as a workpiece that is made of a semiconductor material such as silicon or silicon carbide. The bare wafer is twice to five times thicker than the substrate to be manufactured therefrom, for example. The bare wafer is manufactured by being separated from an ingot made of a semiconductor material such as silicon or silicon carbide, according to the same method as the method described above. It can thus be phrased that the substrate is manufactured from the ingot 11 by repeating the above method twice.

According to the present invention, moreover, a substrate may be manufactured from a cylindrical device wafer as a workpiece that is fabricated from above bare wafer with semiconductor devices formed thereon. The structure, method, etc. according to the above embodiment may be changed or modified appropriately without departing from the scope of the present invention.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of manufacturing a substrate from a cylindrical workpiece having a first circular surface and a second circular surface positioned opposite the first circular surface, the method comprising:
    a peel-off layer forming step of repeatedly moving the workpiece and a focused spot, the focused spot being positioned within the workpiece, of a laser beam that is applied to the workpiece and has a wavelength transmittable through a material of the workpiece, relatively to each other in a processing-feed direction parallel to the first circular surface, thereby forming a peel-off layer in each of a plurality of areas in the workpiece, the areas extending along the processing-feed direction, the peel-off layer containing modified regions formed around a plurality of the focused spots and cracks developed from the modified regions; and
    a separating step of separating the substrate from the workpiece along a plurality of the peel-off layers that act as separation initiating points,
    wherein the plurality of areas include a first outer area at a first end of the workpiece and included in one of two semicylindrical regions of the workpiece, the two semicylindrical regions having a common boundary plane extending through a center of the workpiece and parallel to the processing-feed direction, a first intermediate area included in the one of the two semicylindrical regions and closer to the center of the workpiece than the first outer area in a Y-direction along the first circular surface or the second circular surface of the workpiece, a first inner area included in the one of the two semicylindrical regions and closer to the center of the workpiece than the first intermediate area in the Y-direction along the first circular surface or the second circular surface of the workpiece, a second outer area at a second end of the workpiece, wherein the second end is opposite to the first end, the second outer area included in the other one of the two semicylindrical regions, a second intermediate area included in the other one of the two semicylindrical regions and closer to the center of the workpiece than the second outer area in the Y-direction along the first circular surface or the second circular surface of the workpiece, and a second inner area included in the other one of the two semicylindrical regions and closer to the center of the workpiece than the second intermediate area in the Y-direction along the first circular surface or the second circular surface of the workpiece, and the peel-off layer forming step includes the steps of forming a peel-off layer initially in the first outer area and forming a peel-off layer finally in the first inner area or the second inner area.

2. The method of manufacturing a substrate according to claim 1, wherein the peel-off layer forming step includes the step of forming peel-off layers in a sequence of the first outer area, the first intermediate area, the first inner area, the second outer area, the second intermediate area, and the second inner area.

3. The method of manufacturing a substrate according to claim 1, wherein the peel-off layer forming step includes the step of forming peel-off layers in a sequence of the first outer area, the second outer area, the first intermediate area, the second intermediate area, the first inner area, and the second inner area.

4. The method of manufacturing a substrate according to claim 1, wherein the peel-off layer forming step includes the step of forming peel-off layers in a sequence of the first outer area, the first intermediate area, the second outer area, the second intermediate area, the first inner area, and the second inner area.

5. The method of manufacturing a substrate according to claim 1, wherein the separating step includes separating the substrate from the workpiece along a plurality of the peel-off layers using movable members having tapered wedges that are inserted at least partially into the substrate at each of the peel-off layers.

6. The method of manufacturing a substrate according to claim 1, wherein the separating step includes separating the substrate from the workpiece along a plurality of the peel-off layers by applying a suction force to the substrate at each of the peel-off layers.

* * * * *